US008075684B2

United States Patent
Foster et al.

(10) Patent No.: US 8,075,684 B2
(45) Date of Patent: Dec. 13, 2011

(54) COMPOSITIONS AND METHODS FOR DEEP-SEATED COLORATION AND/OR STAINING OF THE SURFACE TERRAIN, CONSTRUCTION MATERIAL, BOULDERS AND ROCKS

(75) Inventors: Edward F. Foster, Palm Desert, CA (US); Thomas T. Yamashita, Denair, CA (US)

(73) Assignee: Foster-Gardner, Inc., Coachella, CA (US)

( * ) Notice: Subject to any disclaimer, the term of this patent is extended or adjusted under 35 U.S.C. 154(b) by 560 days.

(21) Appl. No.: 12/370,493

(22) Filed: Feb. 12, 2009

(65) Prior Publication Data

US 2009/0314182 A1 Dec. 24, 2009

Related U.S. Application Data

(60) Provisional application No. 61/028,987, filed on Feb. 15, 2008.

(51) Int. Cl.
C09D 5/00 (2006.01)
C09D 5/14 (2006.01)
C09D 105/00 (2006.01)
C04B 14/00 (2006.01)
C04B 16/00 (2006.01)
C04B 103/54 (2006.01)
C09B 67/00 (2006.01)
B05D 5/06 (2006.01)

(52) U.S. Cl. ........... 106/501.1; 106/15.05; 106/18.32; 106/217.5; 106/217.6; 106/217.7; 106/217.9; 106/401; 106/419; 106/456; 106/459; 106/460; 106/461; 106/471; 106/480; 106/499; 106/505; 106/712; 427/372.2

(58) Field of Classification Search .............. 106/15.05, 106/18.32, 217.5, 217.6, 217.7, 217.9, 401, 106/419, 456, 459, 460, 461, 471, 480, 499, 106/501.1, 505, 712; 427/372.2
See application file for complete search history.

(56) References Cited

U.S. PATENT DOCUMENTS

| | | | |
|---|---|---|---|
| 333,457 A | 12/1885 | Foster | |
| 3,650,708 A | 3/1972 | Gallagher | |
| 3,924,037 A * | 12/1975 | Sullivan | 428/15 |
| 3,955,018 A | 5/1976 | Liberto et al. | |
| 4,082,871 A | 4/1978 | Peters | |
| 4,725,451 A | 2/1988 | Cripe | |
| 4,812,340 A | 3/1989 | Cripe | |
| 5,308,646 A | 5/1994 | Moore | |
| 6,025,023 A * | 2/2000 | Valente et al. | 427/256 |
| 6,443,996 B1 * | 9/2002 | Mihelich et al. | 8/522 |
| 7,033,427 B2 * | 4/2006 | Anderson | 106/287.14 |
| 2009/0078014 A1 | 3/2009 | Yamashita | |

* cited by examiner

*Primary Examiner* — Anthony J Green
(74) *Attorney, Agent, or Firm* — Myers Andras Sherman & Zarrabian LLP; Joseph C. Andras

(57) ABSTRACT

An aqueous liquid solution containing soluble salts of coloring metals—particularly manganese and ferric nitrate along with a sugar source and fulvic and/or humic acid can be readily applied to rock, soil or artificial construction surfaces impart a natural color tone to such surfaces. In this manner the visibility manmade disturbances is quickly and easily reduced and disturbed areas readily blend into the natural background. The liquid solution can be readily sprayed on rock or other surfaces. When the ambient temperature is warm natural color will develop in 4-8 days.

22 Claims, No Drawings

COMPOSITIONS AND METHODS FOR DEEP-SEATED COLORATION AND/OR STAINING OF THE SURFACE TERRAIN, CONSTRUCTION MATERIAL, BOULDERS AND ROCKS

CROSS-REFERENCE TO PRIOR APPLICATIONS

The present application is the non-provisional form of U.S. Provisional Application No. 61/028,987, filed on Feb. 15, 2008, and claims priority and benefit of that application.

U.S. GOVERNMENT SUPPORT

Not applicable.

BACKGROUND OF THE INVENTION

1. Area of the Art

The present application is in the art of landscaping and is directed to a product and method for making recent construction, including rock cuts and concrete, blend into the surrounding terrain.

2. Description of the Background Art

New construction particularly when exposed rock and soil surfaces are altered often fails to harmonize with the surrounding terrain because altered surfaces are colored differently than the native surfaces. When the construction contains concrete and metal (iron and steel) components, the new concrete and metal may also present a harsh appearance in spite of the use of concrete coloring agents and metal covering paints. These problems are exacerbated in relatively arid regions like the Southwestern portion of the United States both because the aridity slows the growth of natural vegetation that will in time cover the altered surfaces, and because in relatively arid regions rock surfaces are naturally covered with "desert varnish" a coating that is often much different in color than the "naked" rock surface. The presence of the "desert varnish" makes any alteration to the rock surface that much more obvious.

Because natural coloration to rock surfaces such as "desert varnish" develops slowly over a period of years or even decades or longer, there have been efforts to apply materials to more rapidly mask alteration to the surface so that new construction can more rapidly blend in. The most commonly used approach has been to apply coloring liquids not unlike paints or stains used on wood. Commercially available formulations of paint-like materials available for coloring rock surfaces tend to be superficial and, thus, are readily weathered, commonly fading within as little as a few months. Such liquids gain most of their tinting or coloring power from blending a dye or pigment into a liquid carrier or vehicle such as latex, oil or organic solvent. With even minimal weathering from ambient sunlight, wind or rain such a superficial coating may readily slough from the treated surface and/or the pigments may fade or change hue. Further, because the coloring agent's primary means of attachment to the rock or other surface relies almost entirely upon surface adhesion, the bond between the color and the surface is at best weak and lacks the permanence that is desired.

There have been attempts to more closely replicate naturally developed surface coloration. U.S. Pat. Nos. 4,725,451 and 4,812,340 to Cripe describe a method of simulating "desert varnish" by first reacting the rock surface with a liquid alkali base and then applying a coloring layer of a metallic salts such as iron or manganese salts. U.S. Pat. No. 5,308,646 to Moore discloses a method of applying metal acetate salts to rock surfaces to mimic "desert varnish." This reference particularly prefers the application of iron acetate and manganese acetate. Iron salts are known to impart reddish "rust" colors when they become oxidized. Manganese oxide is black/purple and is believed to be a principle coloring agent in natural "desert varnish." Recent research has confirmed the presence of manganese in "desert varnish" but has also surprisingly revealed that a major constituent of natural "desert varnish" is clay powder apparently from a wind blown source. It is also known that lithophilic bacteria inhabit the surface layers of rocks are at least partially responsible for the process that binds the clay particles and oxidizes the manganese ions to form natural "desert varnish."

SUMMARY OF THE INVENTION

Natural surfaces can be imparted with a natural color by utilizing metallic coloring agents to create a chemical bond between substrate rock, soil, concrete or metal and the coloring agent. The strength and permanence of the bond is improved by selecting forms of the coloring agent from various soluble and reactive salts of color generating elements such as nitrate salts. Salts of pigment forming elements such as iron, copper, cobalt and manganese are advantageously used. A large number of other color or pigment producing metals such as "rare earths" elements and can be used. Salts that are oxidizing agents appear to contribute to a bond between coloring agent (metal atom) and substrate increasing tenaciousness and resulting in greater permanence. The final shades and hues of pigmentation visible to the human eye result from an interaction between the substrate (possibly by means of an oxidizing event) and the coloring metal atoms.

The primary aim of these formulations for rock and surface coloration is to permeate 1-10 mm or more into the surface of the target object (usually rock or concrete—i.e., artificial rock). Therefore, high solubility of the rock staining compounds is an important requirement. High solubility ensures that the active materials are able to penetrate relatively deeply into the rock (or other substrate). To also create subtle to distinct variations in rock staining, most formulations include various carbohydrates, amino acids, proteins and other carbon-hydrogen-oxygen containing materials. These materials provide nourishment for various species of "epiphytes" (organisms which live on the surface of the substrate) such as various algal and lichen species which contributes to the overall staining effect since the algae and lichens are colored themselves. In addition, the organic materials support the growth of lithophilic bacteria. Living organisms tend to secrete compounds that digest or alter the rock surface— thereby enhancing the ability of the staining compounds to penetrate. In addition, the secreted organic materials can act as vehicles to bind the coloring agents within the substrate. In particular, the oxidizing anions may interact with the secreted organic compounds (and in some cases organic compounds added to the mixture) to form a precipitate that further binds the coloring agents. Finally, many of the lithophilic bacteria are chemo-autotrophs which gain energy by oxidizing metal ions. This results in the enhanced precipitation and coloration of some metal ions such as iron and manganese.

Some of the soluble organic compounds used with the metallic coloring agents are complexing agents such as fulvic acid, ulmic acid, citric acid, malic acid, etc). These agents chelate and complex the metal ions to enhance their solubility beyond that provided by anions (as explained below). In particular fulvic and ulmic acids which are complex humic substances have color of their own and also serve as binding materials that can help immobilize the color-forming metal ions.

The basic formula contains an effective concentration of soluble salts of color producing metals. Iron and manganese salts are particularly preferred and an effective formula should contain at least one of these metals. The preferred anion is nitrate but other soluble anions as mentioned herein can be used. A soluble anion that is an oxidizer is preferred. The soluble metal ions are combined with an organic sugar energy source. The preferred material is high fructose corn syrup although glucose syrup or sucrose solutions are also effective. The choice of type of sugar is largely economic although high fructose syrup and sucrose syrup tend to have a lower viscosity (favorable characteristic) than glucose syrup. It is believe that the major function of the sugar energy source is to support the growth of microorganisms that promote the oxidation and coloration. However, the sugars may also function directly in the chemical reactions. At least one organic complexing agent is also required in the formula. The favored agents are fulvic acid and humic acid. For a single complexing agent fulvic acid is preferred. A variety of trace elements are preferably included to promote growth of organisms, and humic acid also serves as a trace element source. In addition, a preservative is added because of the large amount of sugar. Propionic acid is a preferred preservative. A typical formula might contain 0.4M Magnesium, 0.2M Zinc, 0.4M Manganese, 0.3M Iron, 0.04M Copper, 0.008M Cobalt, 0.003M Molybdenum, and 0.02M Boron as well as other active ingredients as shown in the table.

DETAILED DESCRIPTION OF THE INVENTION

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved formula for producing natural "aged" coloration to newly exposed rocks and other surfaces The present invention utilizes the chemical activity of metallic coloring agents to create a chemical bond between substrate rock, soil, concrete or metal and the coloring agent. The strength and permanence of the bond is improved by selecting forms of the coloring agent from various soluble and reactive salts of color generating elements. Examples of these soluble salts are primarily nitrates and chlorides although other soluble anions such as chlorates are useful as well. The effective salts are those of pigment rich elements such as copper (e.g., copper nitrate) cobalt (e.g., cobaltous chloride) and manganese (e.g., potassium permanganate). A large number of other color or pigment producing metals also exist—many of them being "rare earths" elements and can be used in the general formula given below. Many of these compounds are oxidizing agents and such materials appear to contribute to a bond between coloring agent (metal atom) and substrate increasing tenaciousness and resulting in greater permanence. The final shades and hues of pigmentation visible to the human eye result from an interaction between the substrate (possibly by means of an oxidizing event) and the coloring metal atoms. Thus, because of the often, inhomogeneous make-up of the substrate rock, the final outcome will demonstrate highly variable shades and hues with a depth of variation, creating a product of non-repetitive, surprisingly beautiful and natural looking outcome. So that an observer would say the results could only be "generated by the hand of God."

The primary aim of these unique formulations for rock and surface coloration is to permeate 1-10 mm or more into the surface of the target object (usually rock or concrete—i.e., artificial rock). In the case of a metal surface, penetration is necessarily less.

High solubility of the rock staining compounds is an important requirement. For example, the cold water solubility of $Ca(NO_3)_2$ is equivalent to >10,000 lbs in 500 gallons of water at 65° F. (or >2.4 Molar solution). Other nitrate salts tend to have high solubilities. High solubility ensures that the active materials are able to penetrate relatively deeply into the rock (or other substrate). To also create subtle to distinct variations in rock staining, we have, in most formulations, included various carbohydrates, amino acids, proteins and other carbon-hydrogen-oxygen containing materials. These materials works in at least two ways. First, the presence of organic material provides nourishment for various species of "epiphytes" (organisms which live on the surface of the substrate). For example, we have demonstrated that a spray containing these agents enhances bloom of various algal and lichen species. Such a bloom always adds another dimension of artistry to the overall staining effect since the algae and lichens are colored themselves. In addition, the organic materials support the growth of lithophilic bacteria which live both on and within the surface layers of the substrate. All of these living organisms tend to secrete compounds that digest or alter the rock surface—thereby enhancing the ability of the staining compounds to penetrate. In addition, the secreted organic materials can act as vehicles to bind the coloring agents within the substrate. In particular, the oxidizing anions may interact with the secreted organic compounds (and in some cases organic compounds added to the mixture) to form a precipitate that further binds the coloring agents. Finally, many of the lithophilic bacteria are chemo-autotrophs which gain energy by oxidizing metal ions. This results in the enhanced precipitation and coloration of some metal ions such as iron and manganese.

Some of the soluble organic compounds used with the metallic coloring agents are complexing agents such as "humic acids, fulvic acid, ulmic acid, citric acid, malic acid, etc). These agents chelate and complex the metal ions to enhance their solubility beyond that provided by anions (as explained below). In particular fulvic and ulmic acids which are complex humic substances have color of their own and also serve as binding materials that can help immobilize the color-forming metal ions.

To better appreciate the importance of the solubility of the metal ion coloring agents, an extremely soluble substance, calcium nitrate, will be used as an example. It will be apparent to one of skill in the art that calcium ions are not normally considered to be color formers. However, calcium nitrate is extremely soluble thereby permitting penetration into the surface of the substrate. After the calcium ions penetrate, they can be rendered insoluble and the matrix formed by insoluble calcium ions can help bind other metals which are direct color formers. The steps of the process are as follow:

$$Ca(NO_3)_2 + H_2O \rightarrow Ca^{++} + 2NO_3^- \quad\quad 1.$$

The strong oxidizing power of the nitrate group helps ensure that calcium is in a cationic form.

$$Ca^{++} + 2NO_3^- + SO_4^{--} + 2Na^+ \rightarrow CaSO_4 + 2(NaNO_3) \quad\quad 2.$$

When the solution is sprayed onto a rock, the high solubility of the compounds helps to keep them in a reactive, ionic form.

This, then allows the sulfate anion of sodium sulfate (in this example) to interact with the calcium ions to form the relatively insoluble calcium sulfate. The nitrate anion's charge is balanced by the sodium cations (or whatever cation was associated with the sulfate anion). The results are shown here as sodium nitrate, but that salt is actually quite soluble and would most likely be leached away by precipitation or ground water. Although calcium does not provide color, inclusion of soluble calcium salts (about 0.05M to about 0.5M) can result in formation of an insoluble matrix that helps trap color forming agents. Similar precipitation will occur if other less soluble anions (such as $CO_3^{--}$) interact with the cations. Also, many of the color forming metal ions will be precipitated or rendered insoluble by a redox reaction. For example, the permanganate ion ($MnO^{4-}$) is quite soluble, but if this group is reduced (gains electrons) by interaction with organic matter or bacterial electron transport, it can be converted to insoluble manganese dioxide (which is black in color). Similar redox reactions can result in precipitation of other color forming metal ions. Thus, the addition of various organic compounds to the mixture enhances color formation by promoting bacterial growth which leads to reduction of color forming metal ions and by direct redox reactions of the color forming metal ions.

Additional coloring can be achieved through mixing the components and varying the concentration of the spray solution. Spraying the target rocks, metal or concrete at varying temperatures yields variations in the absolute color and intensity of the color effects. Another very important factor in the spray design allows the spray to thoroughly wet the target surface.

The basic formula contains an effective concentration of soluble salts of color producing metals. Iron and manganese salts are particularly preferred and an effective formula should contain at least one of these metals. The preferred anion is nitrate but other soluble anions as mentioned herein can be used. A soluble anion that is an oxidizer is preferred. The soluble metal ions are combined with an organic sugar energy source. The preferred material is high fructose corn syrup although glucose syrup or sucrose solutions are also effective. The choice of type of sugar is largely economic although high fructose syrup and sucrose syrup tend to have a lower viscosity (favorable characteristic) than glucose syrup. It is believe that the major function of the sugar energy source is to support the growth of microorganisms that promote the oxidation and coloration. However, the sugars may also function directly in the chemical reactions. At least one organic complexing agent is also required in the formula. The favored agents are fulvic acid and humic acid (humic acid or humic materials is often a catchall term which includes fulvic and ulmic acid as well as other compounds). The mineral Leonardite is a humic mineral that is the source of trace elements as well as humic acid type materials. For a single complexing agent fulvic acid is preferred. A variety of trace elements are preferably included to promote growth of organisms, and humic acid also serves as a trace element source. In addition, a preservative is added because of the large amount of sugar. Propionic acid is a preferred preservative.

A typical formula might contain 0.4M Magnesium, 0.2M Zinc, 0.4M Manganese, 0.3M Iron, 0.04M Copper, 0.008M Cobalt, 0.003M Molybdenum, and 0.02M Boron as well as other active ingredients as shown in the table. However, as indicated in the table below, there can be a considerable effective range of some of the ingredients. This formula can be used either undiluted or diluted as much as 1 part in 40 parts water depending on the color intensity of the desired results.

| Ingredient | Typical Range (Molarity or amount per 100 gallons) | Comments |
|---|---|---|
| Water | Sufficient to make 100 gallons | (The target water to total volume is between 1:3 and 1:4) |
| Propionic Acid | 0.0003M-0.0015M | Preservative and extracts micronutrients |
| Humic Acid (Leonardite) [micro-nutrient source] | 0.5-5.0 lbs | Complexing/chelating and provides a variety of trace elements |
| 85% Fructose (High Fructose Corn Syrup) | 0.5-10 gallons | Promotes growth of epiphytic algae, bacteria and lichens |
| 2% Fulvic Acid Solution | 2.5-20 gallons | Complexing/chelating agent and trace elements |
| Magnesium Nitrate | 0.05M-0.55M | Contributes to growth of microorganisms |
| Zinc Nitrate (Solution) | 0.0026M-0.52M | Imparts strong oxidation of rock-contained ligands; brownish coloration |
| Manganese Nitrate (Solution) | 0.02M-0.5M | Oxidizer and source of purple-black coloration |
| Ferric Nitrate (Solution) | 0.02M-0.5M | Oxidizer and source of red-brown coloration |
| Cuprous Nitrate (Solution) | 0.008M-0.08M | Oxidizer and source of blue-green coloration |
| Cobalt Nitrate | 0.003M-0.05M | Oxidizer and source of red coloration |
| Sodium Molybdate | 0.0015M-0.025M | Essential nutrient for epiphytes; orange-yellow coloration |
| Sodium Tetraborate | 0.002M-0.03M | Essential nutrient for epiphytes |

Directions for Mixing a 100 Gallon Batch:

1. Fill a holding tank or barrel with the required amount of Propionic Acid+40 gal water and soak the humic acid micronutrients (crumbled to 20-mesh or less particles) to extract essential micro-nutrients. A painter's filter sack can be used as a "tea bag" to contain the humic acid for extraction.
2. Fill the mix tank with 180 gal warm water (approximately 85-115° F.)+the required amount of Fulvic Acid solution and blend thoroughly with agitators running before adding the solution from step 1.
3. Gradually blend in: Magnesium Nitrate (as a stock solution), Zinc Nitrate (as a stock solution, Manganese Nitrate (as a stock solution, Ferric Nitrate (as a stock solution), Cuprous Nitrate (as a stock solution) and continue to homogenize thoroughly.
4. Gradually add the Cobalt Nitrate solid and dissolve completely, then follow the Sodium Molybdate solid and add Sodium Tetraborate solid last. Continue to agitate and blend until all materials are in solution. Gradually add the required amount of high fructose corn syrup and blend thoroughly. Add water until target volume of 100 gallons is reached.
5. Filter through 400 mesh screen and store in a tote until bottled.

The propionic acid is a preservative to prevent growth of microbes during storage as well as an agent to extract micronutrients. Other preservatives such as benzoic acid, citric acid or sorbic acid can be used; citric acid also acts as a complexing agent. However, because part of the goal of the material is to promote bacterial, algal and fungal growth on the substrate to be colored, strong biocides should be avoided. Humic acid micronutrients serve to supply micronutrients for promoting biological growth. In addition, the humic acid is a chelator and organic binding agent (i.e., contributes to an insoluble matrix). Fulvic acid serves a similar purpose. Magnesium nitrate and sodium tetraborate are nutrient compounds with oxidative properties. Although inherently colorless they can contribute to the precipitated matrix material to trap the colored metallic elements. Zinc nitrate contributes to brownish tones; manganese nitrate contributes to purple and black tones; ferric nitrate contributes reddish or brownish tones; cuprous nitrate contributes to bluish and greenish tones; cobalt nitrate provides reddish tones; and sodium molybdate provides orange and yellowish tones. It will be apparent that the exact proportion of the coloring agents can be varied to better match certain types of native rocks or soils. This mixture is a good general purpose stain for a variety of normal rock tones.

Besides the major coloring agents mentioned above, a large number of other metal ions can be included for special purposes as long as the oxidizer/organic energy source/fulvic acid scheme is followed. In particular, small quantities of soluble rare earth elements (elements from the Lanthanide and Actinide series) can be added to modulate the color. Since these elements are expensive and in some cases toxic, they should be used judiciously.

Application to Surfaces:

Depending on quantities of material to be applied and type of surface area to be treated, i.e. rock, concrete, or steel various application devices can be used. For example, a commercial type hand held or backpack sprayer (1-3 gal capacity) can be used for smaller areas (up to about 1,000 square feet). Also, smaller more controlled applications for example, (naked or untreated) rock that is positioned next to decorative stone that is not to be treated can be done with paint brushes and sponge brushes of all sizes. This provides more detailed control when applying material to the surface to be treated without the having danger of overspray or drift (typical from a spray device) that might cause material to be applied on surfaces that were not intended to be treated. Taping off (masking) areas not to be treated is also an option but is cumbersome and increases overall application time.

When applying the material (with any of the application methods) the applicator generously and completely covers the surface to be treated. Runoff may occur and can be evened out with either a sponge or terry cloth rag. Blending and soaking the excess material evenly will eliminate color runs that might develop and look unnatural.

Color Transition and Development:

During the warm summer months initial color cure time will normally take 4-8 days depending on sunlight and heat intensity. Cold winter months typically take at least twice as long, about 10-20 days or more depending again on sunlight and heat intensity. If rain falls or other water intrusion, i.e. irrigation, water truck, etc. occurs during this process it may prolong the color development time or even necessitate reapplication of the product to reach target color. During color transition and development the active ingredients penetrate into the rock surface where chemical and biological reactions cause the color to develop and become fixed in place.

The precise color characteristics depend on the types and amounts of metal ions used. The following description is based on the example formula given above. The final color hue reached is dependent on surface type, but typically immediately after applying the material a yellowish orange will appear for a few days depending on time of year. After a period of days the surface color will then transition from a yellowish to orangey rust color and remain like that for a few more days. The final color transition is from orangey rust to earth tone browns, light, medium, and dark depending on the concentration of the initial application.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

We claim:

1. An aqueous liquid for application to natural and construction surfaces to impart a natural and substantially permanent coloration to the surfaces, the aqueous liquid comprising:
   between about 0.04M and 1.0M primary coloring metal salts selected from the group consisting of iron, manganese and mixtures thereof, wherein the counterion is selected from the group consisting of nitrate, chloride and sulfate and mixtures thereof;
   between about 0.4% by weight and 8.5% by weight of a sugar selected from the group consisting of high fructose corn syrup, glucose, sucrose and mixtures thereof;
   between about 0.0006% by weight and 0.4% by weight of an organic complexing-matrix agent selected from humic acid, ulmic acid, fulvic acid and mixtures thereof;
   a preservative; and
   water.

2. The aqueous liquid according to claim 1 further comprising secondary coloring metal salts selected from the group consisting of water soluble salts of zinc, copper, cobalt, molybdenum, lanthanides, actinides and mixtures thereof.

3. The aqueous liquid according to claim 1 further comprising between about 0.05M and 0.055M magnesium nitrate.

4. The aqueous liquid according to claim 1, wherein the preservative is selected from propionic acid, benzoic acid, citric acid, sorbic acid and mixtures thereof.

5. The aqueous liquid according to claim 4, wherein the preservative comprises between about 0.0003M and 0.0015M propionic acid.

6. The aqueous liquid according to claim 1 further comprising between about 0.05M and about 0.5M of a soluble calcium salt.

7. The aqueous liquid according to claim 6, wherein the soluble calcium salt is calcium nitrate.

8. The aqueous liquid according to claim 1 further comprising minor growth factors selected from soluble forms of magnesium, molybdenum and boron.

9. An aqueous liquid for application to natural and construction surfaces to impart a natural and substantially permanent coloration to the surfaces, the aqueous liquid comprising:
   between about 0.04M and 1.0M primary coloring metal salts selected from the group consisting of iron nitrate, manganese nitrate and mixtures thereof;
   between about 0.4% by weight and 8.5% by weight of a sugar selected from the group consisting of high fructose corn syrup, glucose, sucrose and mixtures thereof;
   between about 0.0006% by weight and 0.4% by weight of an organic complexing-matrix agent selected from humic acid, ulmic acid and mixtures thereof;

between about 0.05% by weight and 0.4% by weight of fulvic acid;

a preservative; and water.

10. The aqueous liquid according to claim 9 further comprising secondary coloring metal salts selected from the group consisting of water soluble salts of zinc, copper, cobalt, molybdenum, lanthanides, actinides and mixtures thereof.

11. The aqueous liquid according to claim 9 further comprising between about 0.05M and 0.55M of magnesium nitrate.

12. The aqueous liquid according to claim 1, wherein the preservative is selected from propionic acid, benzoic acid, citric acid, sorbic acid and mixtures thereof.

13. The aqueous liquid according to claim 9 further comprising between about 0.05M and about 0.5M of calcium nitrate.

14. The aqueous liquid according to claim 4, wherein the preservative comprises between about 0.0003M and 0.0015M propionic acid.

15. The aqueous liquid according to claim 1 further comprising minor growth factors selected from soluble forms of magnesium, molybdenum and boron.

16. An aqueous liquid for application to natural and construction surfaces to impart a natural and substantially permanent coloration to the surfaces, the aqueous liquid comprising:

between about 0.02M and 0.5M iron nitrate;

between about 0.02M and 0.5M manganese nitrate;

between about 0.002M and 0.5M of secondary coloring metal ions;

between about 0.4% by weight and 8.5% by weight of a sugar selected from the group consisting of high fructose corn syrup, glucose, sucrose and mixtures thereof;

between about 0.0006% by weight and 0.4% by weight of an organic complexing-matrix agent selected from humic acid, ulmic acid, fulvic acid and mixtures thereof;

between about 0.05M and 0.55M of magnesium nitrate;

soluble sources of molybdenum and boron;

between about 0.003M and 0.0015M propionic; and water.

17. The aqueous liquid according to claim 16, wherein the secondary coloring metal ions are selected from the group comprising zinc ions, copper ions, cobalt ions and mixtures thereof.

18. The aqueous liquid according to claim 17, wherein the secondary coloring metal ions further comprise water soluble lanthanides, actinides and mixtures thereof.

19. The aqueous liquid according to claim 16, wherein the soluble source of boron is between about 0.002M and 0.03M sodium tetraborate.

20. The aqueous liquid according to claim 16 further comprising between about 0.05M and about 0.5M of calcium nitrate.

21. A method for imparting color to natural surfaces and construction surfaces comprising the steps of:

applying an aqueous liquid to the surfaces wherein the aqueous liquid comprises:

between about 0.04M and 1.0M primary coloring metal salts selected from the group consisting of iron, manganese and mixtures thereof, wherein the counterion is selected from the group consisting of nitrate, chloride and sulfate and mixtures thereof;

between about 0.4% by weight and 8.5% by weight of a sugar selected from the group consisting of high fructose corn syrup, glucose, sucrose and mixtures thereof;

between about 0.0006% by weight and 9.4% by weight of an organic Complexing-matrix agent, selected from humic acid, ulmic acid, fulvic acid and mixtures thereof;

a preservative; and water; and allowing the applied aqueous liquid to cure whereupon color develops.

22. A method for imparting color to natural surfaces and construction surfaces comprising the steps of:

applying an aqueous liquid to the surfaces wherein the aqueous liquid comprises:

between about 0.02M and 0.5M iron nitrate;

between about 0.02M and 0.5M manganese nitrate;

between about 0.002M and 0.5M of secondary coloring metal ions;

between about 0.4% by weight and 8.5% by weight of a sugar selected from the group consisting of high fructose corn syrup, glucose, sucrose and mixtures thereof;

between about 0.0006% by weight and 0.4% by weight of an organic complexing-matrix agent selected from humic acid, ulmic acid, fulvic acid and mixtures thereof;

between about 0.05M and 0.55M of magnesium nitrate;

soluble sources of molybdenum and boron;

between about 0.003M and 0.0015M propionic; and water; and allowing the applied aqueous liquid to cure whereupon color develops.

* * * * *